2 Sheets—Sheet 1.

W. B. GOULD & N. FEICK.
MACHINE FOR MAKING TRUNK CORNER CLAMPS.

No. 187,267. Patented Feb. 13, 1877.

Witnesses
J. C. Tunbridge
D. V. Briesen

Inventors
Wm. B. Gould
Nikolaus Feick
by their attorney
A. v. Briesen

2 Sheets—Sheet 2.
W. B. GOULD & N. FEICK.
MACHINE FOR MAKING TRUNK CORNER CLAMPS.
No. 187,267. Patented Feb. 13, 1877.
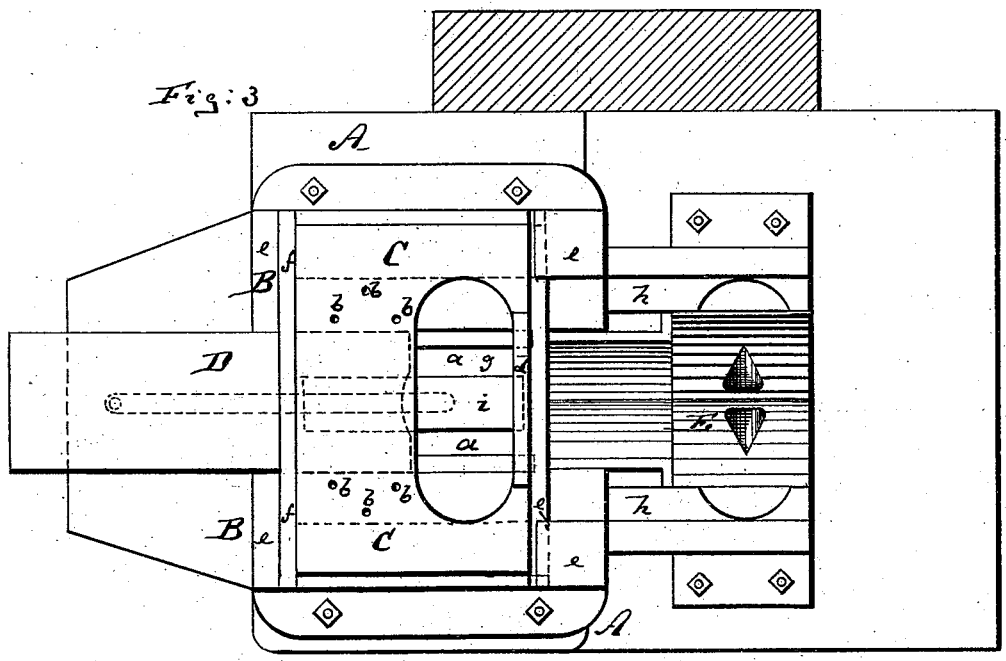
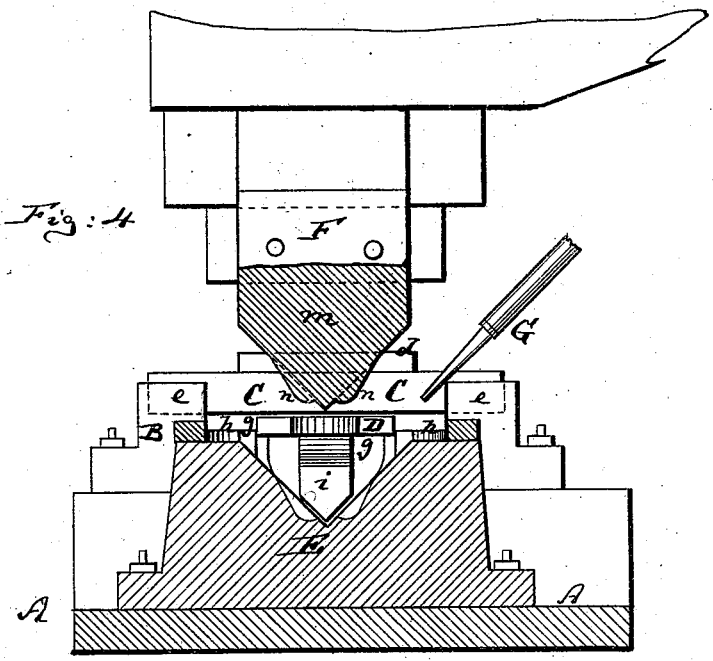
Witnesses
J. C. Tunbridge
D. Briesen
Inventors
Wm. B. Gould
Nikolaus Feick,
by their attorney
A. v. Briesen

UNITED STATES PATENT OFFICE

WILLIAM B. GOULD, OF MONTROSE, AND NIKOLAUS FEICK, OF NEWARK NEW JERSEY, ASSIGNORS TO SAID GOULD.

IMPROVEMENT IN MACHINES FOR MAKING TRUNK CORNER-CLAMPS.

Specification forming part of Letters Patent No. 187,267, dated February 13, 1877; application filed January 10, 1877.

*To all whom it may concern:*

Figure 1:
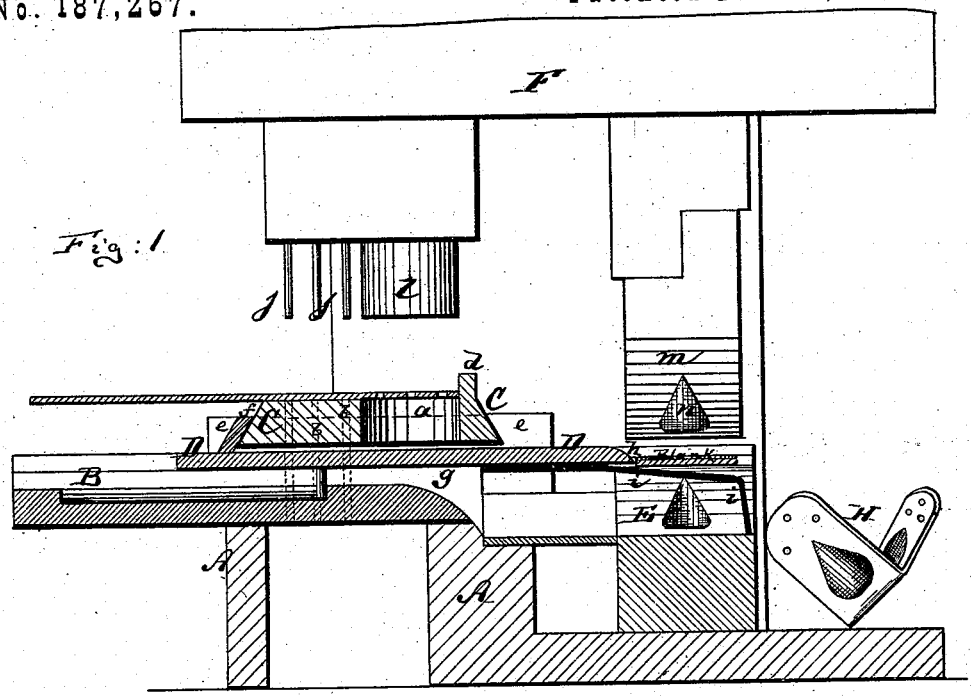
Figure 2:
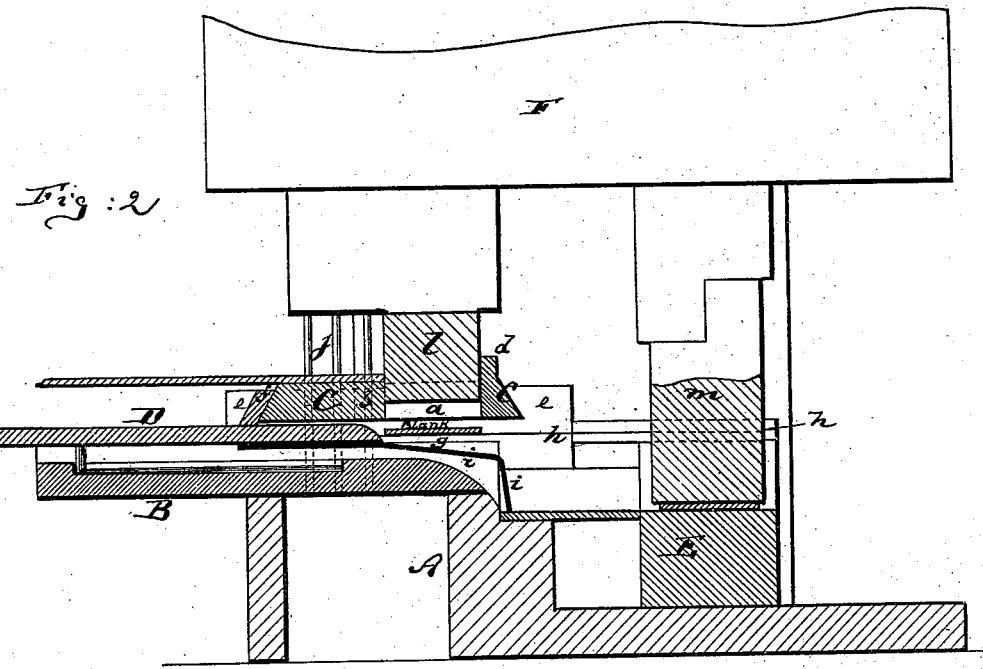

Be it known that we, WILLIAM B. GOULD, of Montrose, in the county of Essex and State of New Jersey, and NIKOLAUS FEICK, of Newark, in the county of Essex and State of New Jersey, have invented a new and Improved Machine for Making Trunk Corner-Clamps, of which the following is a specification:

Figure 1 is a vertical longitudinal section of our improved machine for making trunk corner-clamps. Fig. 2 is a similar view thereof, showing the parts in a different position. Fig. 3 is a plan view of the lower or bed part of said machine. Fig. 4 is a vertical transverse section through the shaping-punch and mold of the same.

Similar letters of reference indicate corresponding parts in all the figures.

This invention has for its object to produce a machine for cutting, perforating, bending, and bulging, in one continuous operation, the wrought-metal blanks used in the manufacture of bulging corner-clamps for trunks. It consists in the novel combination and arrangement of parts for effecting the desired result, all as hereinafter more fully described.

The corner-clamps to be produced by this machine are V-shaped pieces of flat metal, bulged at the corners or sides to form projecting hollow beads, and perforated near the ends to receive the nails or screws that fasten them to the sides of a trunk.

In the drawing, the letter A represents the stationary bed of our machine. Upon it is secured, by suitable bolts or screws, a table, B, which, in turn, supports a detachable die or plate, C. This plate has a vertical aperture, *a*, of the size and shape of the blank to be cut out, and is, in front of this aperture *a*, provided with a series of smaller holes, *b b*, for purposes hereinafter pointed out. Directly behind the aperture *a* is formed, on the plate C, a projecting ridge or stop, *d*.

We prefer to secure the die or plate C to the table B by providing the latter with projecting dovetail-shaped lugs *e e*, and fastening the plate C therein by means of a key, *f*. This enables us to remove the plate C and replace it by another having a larger or smaller aperture, *a*, or having the holes *b* differently disposed. Beneath the aperture *a* is formed on the surface of the table B, a recess, *g*, for receiving the blank that is dropped through such aperture. D is a slide, arranged lengthwise in a groove of the table B, on a level with the surface thereof, and higher than the face of the recess *g*. Rails *h h* extend from the table B, and connect the same with the elevated parts of a female V-shaped die, E, that is placed near one end of the bed A. The surfaces of these rails are on a level with and constitute continuations of the surface of the recess *g*. The inclined faces of the die E, at or near their junction, have cavities formed in them. The slide D has a downwardly-projecting pusher-piece or hook, *i*, formed on its end, as shown. Reciprocating motion in a horizontal direction can be imparted to the slide D by suitable means. (Not shown.) F is a vertically-reciprocating plunger, moved by suitable machinery, and placed over the plate C and die E, in manner indicated in the drawing. This plunger F carries a series of pendent pins, *j j*, above the several apertures *b b*, and of a size to fit the same; also, a block or cutter, *l*, of the size and shape of the hole *a* directly above said hole; also, a male V-shaped punch, *m*, directly above the die E, and of a size and form to fit the same, all as indicated in Fig. 4. The punch *m* has bulge-like projections *n n* to fit the cavities of the die E. Instead of making the female die stationary and moving the punch, the latter may be placed at the bottom and the die caused to move; but we prefer the special arrangement shown. G is a blow-pipe leading from a suitable pair of bellows or pumps into or toward the hollow of the die E, for the purpose of blowing it clean after every stamping operation.

The operation of the apparatus is as follows: A plate of sheet metal of the requisite width and thickness is first placed on the plate C, over the holes *b b*; the plunger then descends, and by means of the pins *j j* it punches holes through such plate, which are to be in the ends of the corner-clamp. The plate is next, after the plunger is elevated, shoved against the rib or stop *d* on the plate C, and the plunger once more brought down, cutting th its cutter *l* a blank of the desired shape t of the metal plate, and pushing the same to the recess *g*. The pins *j* meanwhile perforate another part of the metal plate in the desired place. After the plunger has next been elevated the metal plate is again pushed against the rib *d*, and the slide D is moved to push the blank from the recess *g*, along the rails *h h*, into position above the die E, as in Fig. 1. The slide D is then drawn back again and the plunger once more caused to descend. This time, and ever after, the plunger performs three operations, for it perforates the metal plate again with its pins *j*, it cuts out a new blank with the cutter *l*, and with the punch it bends the first-made blank by crowding into the die E, as in Fig. 2, and by this motion also forms the desired hollow beads on the clamp. After the plunger has again been elevated, the slide D is again moved to carry another blank into position on the die E, and to push with its hook-like projection *i* the completed corner-clamp H out of the die, as clearly indicated in Fig. 1.

The motions above described are then repeated with the result stated. After a completed clamp has been discharged from the die, a puff of air is blown through the pipe G into said die to clear the same of all scales and impurities that may have been deposited therein by the punching process.

We claim as our invention—

1. The combination of the die-bed A, provided with the die-plate C, perforated as described, and the V-shaped die E, with the plunger F, provided with cutter *l*, pins *j*, and punch *m*, substantially as described.

2. The plate C, made with the holes *b* and perforation *a*, and with the rib *d*, in combination with the pusher-plate D and rails *h*, substantially as specified.

3. The pusher-piece *i*, placed on the blank-pusher D, to operate in combination with the die E, substantially as herein shown and described.

WILLIAM B. GOULD.
NIKOLAUS FEICK.

Witnesses:
F. V. BRIESEN,
J. TURK.